United States Patent
Lucidarme et al.

(10) Patent No.: US 7,369,814 B2
(45) Date of Patent: May 6, 2008

(54) METHOD OF TRANSMITTING RADIO SIGNALS WITH POLARIZATION DIVERSITY AND RADIOCOMMUNICATION STATION AND TERMINAL FOR IMPLEMENTING THE METHOD

(75) Inventors: Thierry Lucidarme, Montigny le Bretonneux (FR); Nidham Ben Rached, Paris (FR)

(73) Assignee: Nortel Networks Limited, St. Laurent, Quebec (CA)

( * ) Notice: Subject to any disclaimer, the term of this patent is extended or adjusted under 35 U.S.C. 154(b) by 585 days.

(21) Appl. No.: 10/645,254

(22) Filed: Aug. 21, 2003

(65) Prior Publication Data

US 2004/0127175 A1    Jul. 1, 2004

(30) Foreign Application Priority Data

Aug. 27, 2002    (FR)    ................................. 02 10613

(51) Int. Cl.
*H04B 1/00* (2006.01)
*H04B 17/00* (2006.01)
*H04B 7/00* (2006.01)

(52) U.S. Cl. .................. 455/69; 455/127.1; 455/522; 455/115.1; 370/318

(58) Field of Classification Search ................ 455/69, 455/70, 522, 226.1, 226.2, 127.1, 127.2, 455/127.5, 67.11, 67.13, 115.1; 370/318
See application file for complete search history.

(56) References Cited

U.S. PATENT DOCUMENTS

| | | | |
|---|---|---|---|
| 5,570,349 A | | 10/1996 | Bustamante et al. |
| 6,154,659 A | * | 11/2000 | Jalali et al. .................. 455/522 |
| 6,411,824 B1 | | 6/2002 | Eidson |
| 6,591,106 B1 | * | 7/2003 | Zirwas ....................... 455/450 |

FOREIGN PATENT DOCUMENTS

| WO | WO01/54230 | 7/2001 |
|---|---|---|
| WO | WO01/86823 | 11/2001 |
| WO | WO02/103928 | 12/2002 |

\* cited by examiner

*Primary Examiner*—Matthew Anderson
*Assistant Examiner*—Eugene Yun
(74) *Attorney, Agent, or Firm*—Trop, Pruner & Hu, P.C.

(57) ABSTRACT

Several versions of the radio signal are transmitted with different polarizations from a first station to a second station. The respective transmission powers of these versions of the radio signal are adaptively controlled according to measurements carried out by the first station on signals transmitted by the second station.

19 Claims, 5 Drawing Sheets

METHOD OF TRANSMITTING RADIO SIGNALS WITH POLARIZATION DIVERSITY AND RADIOCOMMUNICATION STATION AND TERMINAL FOR IMPLEMENTING THE METHOD

BACKGROUND OF THE INVENTION

The present invention relates to the field of radiocommunication. It applies especially in radiocommunication systems using polarization diversity.

Conventionally, mobile radiocommunication systems use diversity processing techniques that allow their performance to be improved. Diversity processing is based on the combining of information received from several signals transmitted from a source to a receiver. Diversity may be introduced into several parameters, such as time, space, frequency or polarization of an electromagnetic wave, and this gives rise to many techniques.

Various transmission diversity methods are, for example, currently provided in third-generation cellular networks of the UMTS (Universal Mobile Telecommunications System) type in the downlink direction (from the network to the mobile units). A first category of methods, called open-loop transmission diversity methods, employ STTD (Space-Time Transmit Diversity) or TSTD (Time Switch Transmit Diversity) schemes.

The STTD diversity scheme is based on space-time coding. According to this scheme, two signals $s_0$ and $s_1$ are transmitted simultaneously at a time t and over a period T of a symbol time on two antennas 0 and 1 respectively. At time t+T, the signals $-s_1^*$ and $s_0^*$ are transmitted simultaneously over a period T to the antennas 0 and 1 respectively (the symbol "*" denoting the complex conjugation operation). It thus makes it possible, in a system consisting of two transmit antennas and one receive antenna, to obtain the same order of diversity as in a system consisting of one transmit antenna and two receive antennas, from which the signals are processed by a diversity receiver using the optimal combining method (MRC, Maximum Ratio Combining).

The STTD scheme as applied in UMTS-type networks is described in Section 5.3.1.1.1 of the Technical Specification 3G TS 25.211, "Physical channels and mapping of transport channels onto physical channels (FDD)", Version 3.9.0 published in December 2001 by 3GPP ("3rd Generation Partnership Project").

Closed-loop transmit diversity is also employed in these third-generation networks. A detailed description of this is given in Section 7 of the Technical Specification 3G TS 25.214, "Physical layer procedures (FDD)—Release 1999", Version 3.9.0, published in December 2001 by 3GPP.

According to this scheme, a signal is transmitted from two antennas, after it has been weighted in each transmission branch by a weight intended to correct its phase and/or its amplitude so as to maximize the power of the useful signal received by the receiver. A feedback loop is used to update the optimal weight vector at the transmitter. Such a scheme is potentially sensitive to the speed of movement of the receiver. A high speed may require the phase to be corrected and the weighting vector to be updated more rapidly than the speed of the feedback loop currently provided.

The base stations of cellular systems that exploit polarization diversity use, for example, a cross-polar antenna system, i.e. two antennas placed at the same point and arranged at 90° to each other (one is, for example, sensitive to the vertical polarization and the other sensitive to the horizontal polarization). The transmitted signal is received via a polarization-diversity antenna system in two branches of the receiver. Combining techniques are then used to take advantage of the independence of behavior along the propagation path of orthogonally polarized signals. More specifically, the polarization diversity gain results from the rotation of the polarization when the transmitted electromagnetic wave is randomly reflected off obstacles. Conventionally, it is accepted that signals received with polarization diversity must be weakly correlated so that the combining delivers a gain that justifies the use of this technique. Lee and Yeh ("Polarization diversity system for mobile radio", IEEE Trans. Com., Vol. COM-20, No. 5, pp. 912-922, 1972) have considered that effective diversity may be achieved with a correlation coefficient of less than 0.7.

The present invention relates especially to a dual transmit polarization diversity scheme. In such a scheme, the radio transmission is distributed over two units each designed to transmit a signal in a pre-determined polarization. It may for example be employed in a base station provided with a cross-polar antenna system and with two radio transmitters, one being designed to transmit in vertical linear polarization and the other in horizontal linear polarization.

Such base stations are described for example in U.S. Pat. No. 6,411,824 and WO 01/54230.

Application WO 01/54230 describes in particular a system for reducing the effects of fast fading observed in a communication channel with a mobile unit. According to the method described, a transmitter (of a base station or of a mobile unit) scans predetermined transmission polarization states. An optimal state is selected using an open-loop or closed-loop method. Such a method requires a rate of updating the optimal polarization, on the basis of minimizing the effects of fading, corresponding to the rate of change of this phenomenon. In the example described, the matching is thus carried out at a rate of the order of one frame of 10 ms duration. Such a rate is somewhat incompatible with a closed-loop method, the rate of the feedback loop imposing an excessive load on the air interface, taking into account the advantages afforded by the method.

One object of the present invention is to propose another mode of polarization diversity, which provides an appreciable receive gain without seeking to follow the fast fading of the channel, which would impose a signaling load difficult to accept.

SUMMARY OF THE INVENTION

The invention proposes a method of transmitting a radio signal in polarization diversity, wherein a plurality of versions of the radio signal having different polarizations are transmitted from a first station to a second station. According to the invention, the respective transmission powers of said versions of the radio signal are adaptively controlled according to measurements carried out by the first station on signals transmitted by the second station.

The method according to the invention is based on the observation that, in general, independently of the fast fading phenomenon, one polarization is favored over the other at a given instant in terms of power of the useful signal measured at the receiver. It is therefore judicious to favor one of the two polarizations in transmission.

However, the favored polarization changes over the course of time, for example because of the mobility of one or other of the two stations or because of the presence of moving reflectors, obstacles or interferers. If one of the stations is a mobile cellular radiocommunication terminal, the power received is on average identical in both polarizations, whereas on a timescale over which the movements of the terminal are not too great (for example from a few hundred milliseconds to a few seconds), one of the polarizations may be privileged. For normal speeds of movement, this timescale is long compared with that of the variations of the fading phenomenon in the propagation channel.

Adaptive control of the transmission powers applied in the method according to the invention advantageously makes it possible to follow these changes in order to provide improved reception performance.

The invention thus derives benefit from the absence of a speed constraint weighing on the frequency of the feedback loop of certain closed-loop schemes. It also makes it possible to provide an inexpensive improvement in terms of complexity to the STTD open-loop diversity scheme.

Another aspect of the present invention relates to a radiocommunication station with polarization diversity, comprising means for transmitting a plurality of versions of a radio signal having different polarizations to a remote radiocommunication station. This station according to the invention further comprises means for measuring parameters on the basis of signals transmitted by said remote station and means for adaptively controlling the respective transmission powers of said versions of the radio signal according to said measured parameters.

The invention also provides a radiocommunication terminal comprising means for communicating with a network infrastructure that incorporates a radiocommunication station as defined above, means for receiving and processing signals transmitted with polarization diversity in n_pol polarizations by said station, means for at least measuring, for some of the signals transmitted by said radiocommunication station in a defined polarization among n_pol, a mean power contribution of the noise that interferes with the useful signal relating to said transmitted signal, and means for transmitting said mean noise power contribution measurements to the radiocommunication network infrastructure.

DESCRIPTION OF PREFERRED EMBODIMENTS

Figure 1:
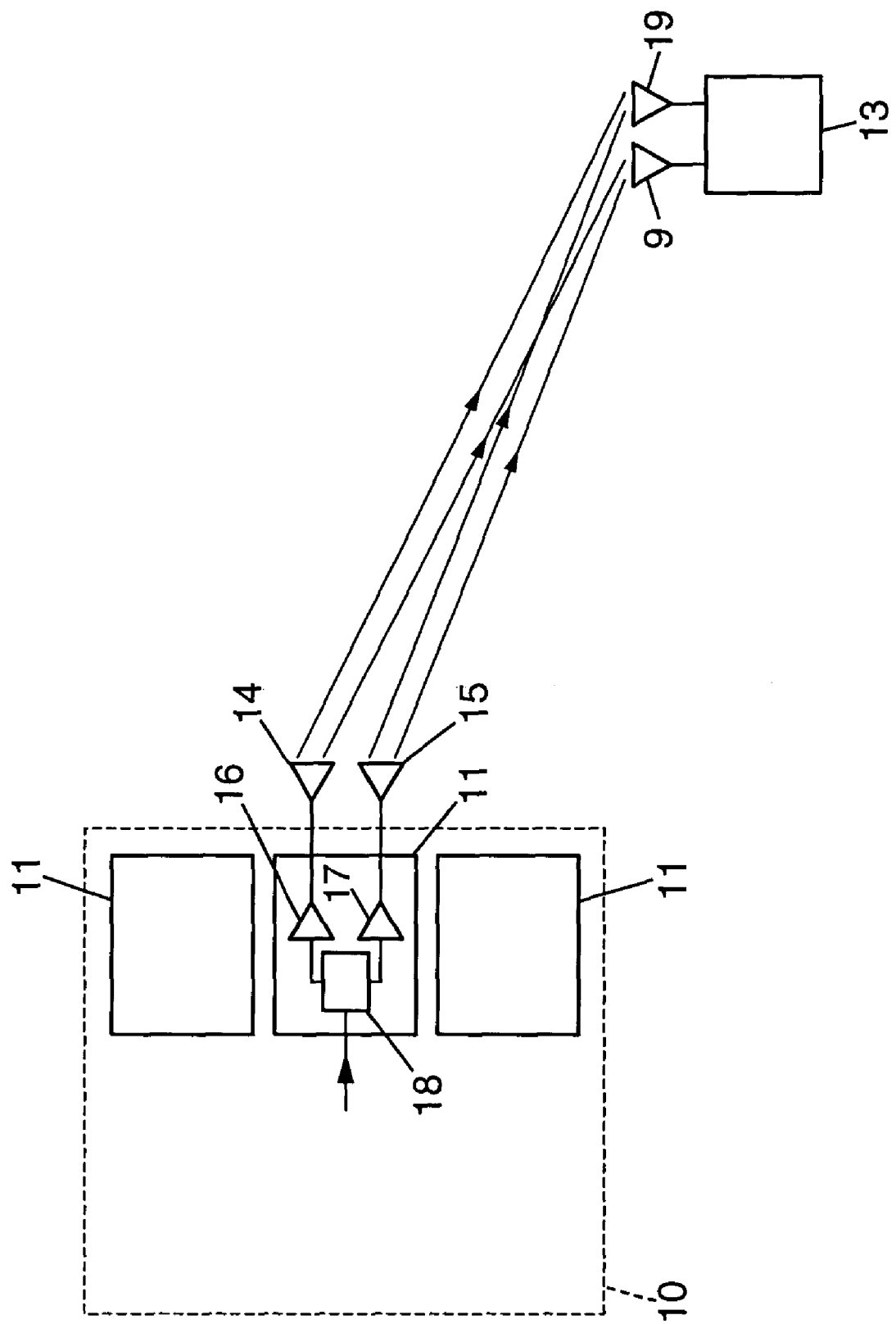
FIG. 1 is a diagram of a radiocommunication station and of a mobile terminal illustrating a first embodiment of the invention.

FIG. 1 shows a station (10) of a radiocommunication network according to the invention. The station (10) communicates with a radio network controller (not shown in the figure) and serves one or more cells by means of respective transceivers (11). A mobile station (typically a terminal) (13) is located within the coverage of a transceiver (11). The transceiver (11) generates, in transmit mode, radiating fields with n_pol polarizations (n_pol being equal to 2 in the example of FIG. 1) using n_pol co-located antennas. In the example shown in FIG. 1, it transmits a vertically polarized radio signal on a first antenna (14) and a horizontally polarized radio signal on a second antenna (15). According to the conventional polarization-diversity technique, these vertically and horizontally polarized radio signals are in fact two versions of the same signal. Each antenna (14) (15) is coupled to an amplifier (16) (17), the input of which is fed via one of the two outputs of a distribution coupler (18). According to one particular embodiment of the invention, the two versions of the radio signal are transmitted simultaneously, in which case the two versions are delivered to the input of the coupler (18).

The station (13) is also provided with n_ant antennas (9) (19) (n_ant being 2 in the example shown in FIG. 1), each sensitive in receive mode to the n_pol transmission polarizations of the station (10) so as to operate in polarization-diversity mode. Such antenna systems may, for example, be composed of crossed dipole elements oriented at an angle of $2\alpha$ between them in order to allow linear polarizations angularly spaced apart by $2\alpha$ to be received. In the example shown in FIG. 1, the station (13) also transmits signals in two polarizations spaced apart by $2\alpha$ (typically, $2\alpha=90°$).

We therefore consider the case of transmit diversity of order n_div=n_ant×n_pol (n_div being equal to 4 in the example shown in FIG. 1) and reception by a radiocommunication station (13) of a sequence of symbols (seq) transmitted from the transceiver (11) operating in polarization-diversity mode. Each antenna (14) (15) therefore radiates a field in a polarization $(pol\_i)_{1 \leq i \leq n\_pol}$ which transports the transmitted sequence $(Seq^{pol\_i})_{1 \leq i \leq n\_pol}$. The aim is then to determine a vector whose components are the powers $(p_{e,BS}^{pol\_i})_{1 \leq i \leq n\_pol}$ of each sequence $(seq^{pol\_i})_{1 \leq i \leq n\_pol}$, transmitted with a given polarization $(pol\_i)_{1 \leq i \leq n\_pol}$, so as to distribute the power optimally between the various transmission polarizations from the transceiver (11). The sum of the powers $(p_{e,BS}^{pol\_i})_{1 \leq i \leq n\_pol}$ is increased by the total power P available for transmission. The optimal power distribution vector is estimated by minimizing a cost function relating to the quality of the useful signal received by the receiving station (13), which may be the mean bit error probability.

Figure 2:
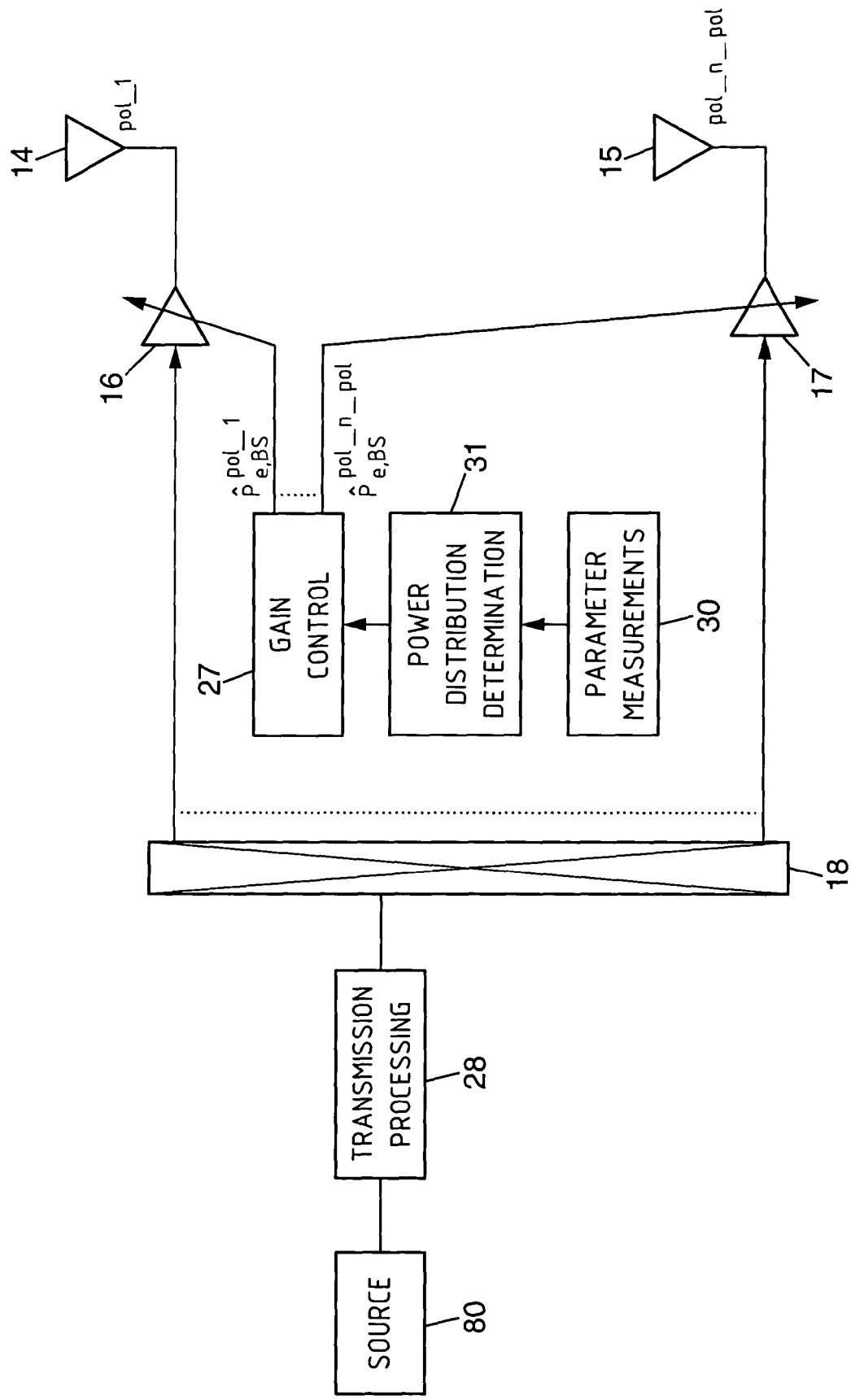
FIG. 2 is a block diagram of a radiocommunication station according to the invention.

FIG. 2 shows the transmitter of a transceiver (11) of a radiocommunication station (10) according to the invention. Each of the n_pol antennas (14) (15) is designed to radiate a field with one of the n_pol transmission polarizations of the station and is coupled to an amplifier (16)(17), the input of which is fed by one of the outputs of the coupler (18). The data to be transmitted, coming from a source (80), is processed for the purpose of transmission by the module (28) that carries out the modulation processing, and the output of which is connected to the coupler (18) in order to be distributed over the n_pol transmit polarizations. The transmission powers delivered by the power amplifiers (16) (17) are each controlled by the drive module (27) so as to distribute the transmission power over the n_pol transmission branches in the optimum distribution estimated by the module (31). Given below will be illustrative examples of the invention in which parameters for the transmitting and receiving of signals for the purpose of determining the optimal distribution of the powers are measured. These measurements are provided by the module (30) in the example shown in FIG. 2.

Returning to FIG. 1, that portion of the useful signal received by the receiving station (13) on each ant_j antenna (9) (19) is formed from the contributions of each transmitted sequence $(seq^{pol\_i})_{1 \leq i \leq n\_pol}$, denoted by $(seq^{pol\_i,ant\_j})_{1 \leq i \leq n\_pol, 1 \leq j \leq n\_ant}$. Each antenna (9) (19) is coupled to a diversity receiver that carries out radio signal (amplification, frequency transposition, filtering and digitization) and demodulation in order to provide estimates of the transmitted sequences, which are combined to give a diversity gain. The combining may especially be optimal combining of the MRC type, which weights the various estimates according to the complex amplitudes observed for the various paths. The sequences output by each receiver may in turn be combined using the MRC method.

The invention will be described below in the case of links between the stations (10) and (13) using DPSK (Differential Phase Shift Keying). The mean bit error probability after MRC combining is given by:

$$BER_{MRC} = \frac{1}{2} \cdot \prod_{k=1}^{n\_div} \left( \frac{1}{1+\gamma_k} \right) \quad (1)$$

where $(\gamma_k)_{1 \leq k \leq n\_div}$ denotes the mean signal-to-noise ratio measured on the useful signal portions received on an antenna $(ant\_j)_{1 \leq j \leq n\_ant}$ in the polarization $(pol\_i)_{1 \leq i \leq n_{13}pol}$ in the presence of fast fading having a Rayleigh probability density.

The invention aims at determining a transmission power distribution in each polarization at the station (10). For dual polarization diversity, the powers received by the station (13) on each antenna may be expressed by means of the following matrix equation:

$$\begin{pmatrix} p_{r,MS}^{ant\_1} \\ p_{r,MS}^{ant\_2} \end{pmatrix} = \begin{pmatrix} b_1 & b_2 \\ b_3 & b_4 \end{pmatrix} \begin{pmatrix} p_{e,BS}^{pol\_1} \\ p_{e,BS}^{pol\_2} \end{pmatrix} \quad (2)$$

The coefficients $(b_k)_{1 \leq k \leq n\_div}$ are power transfer coefficients representing an average over a time interval long enough to smooth out the variations in the channel due to Rayleigh fading, but short enough to preserve a certain differentiation of the polarizations taking into account the mobility of the station (13) with respect to the antennas (14) and (15) of the transceiver (11). Typically, this time interval will be around 10 ms to a few seconds. The quantities $(p_r^{ant\_j})_{1 \leq j \leq n\_ant}$ and $(p_e^{pol\_i})_{1 \leq i \leq n\_pol}$ therefore represent mean power contributions in each transmit polarization pol_i or receiving antenna ant_j, respectively, these being measured over a time interval of around 10 ms to a few seconds. In the reverse direction, if it is assumed that each of the antennas (14) (15) is also sensitive in receive mode to the n_pol polarizations, the powers received by the base station (11) in each polarization may be expressed by means of the following matrix equation:

$$\begin{pmatrix} p_{r,BS}^{ant\_1} \\ p_{r,BS}^{ant\_2} \end{pmatrix} = \begin{pmatrix} b'_1 & b'_2 \\ b'_3 & b'_4 \end{pmatrix} \begin{pmatrix} p_{e,MS}^{pol\_1} \\ p_{e,MS}^{pol\_2} \end{pmatrix} \quad (3)$$

By working with mean quantities measured over such a time interval, the reciprocity theorem allows the power transfer matrices in the downlink direction and in the uplink direction to be considered to be almost identical, so that the following approximation may be made: $b'_k = b_k$, $\forall 1 \leq k \leq n\_div$. This averaging interval makes it possible in fact to ignore, for the the calculations, the fast fading phenomena, the coefficients of the power transfer matrix reflecting the slow variations in the attenuation that are observed in the propagation channel.

In the present embodiment of the invention, the quantities $(\gamma_k)_{1 \leq k \leq n\_div}$ may be written as $$\gamma_k = \frac{pow_r^{(pol\_i, ant\_j)}}{N_r^{(pol\_i, ant\_j)}}$$

for $1 \leq i \leq n\_pol$, $1 \leq j \leq n\_ant$, where $pow_r^{(pol\_i, ant\_j)}$ denotes the mean power contribution received on the antenna ant_j of the useful signal transmitted with the polarization pol_i, and $N_r^{pol\_i, ant\_j}$ denotes the mean power contribution received on the antenna ant_j of the corresponding noise. The power transfer matrix is then used to give $$\gamma_k = \frac{b_k \cdot p_t^{pol\_i}}{N_r^{pol\_i, ant\_j}}.$$

Minimizing the cost function $BER_{MRC}$ (1) then amounts to determining the positive roots of a 3rd-order polynomial in $p_e^{pol\_1}$, making it possible to obtain the expression for the optimal powers for each transmitted polarization, for example in the downlink direction. These optimal power values are transmitted to the control module (27) so as to be taken into account in controlling the amplification means (16) (17) of the transceiver (11).

The determination of the optimal power distribution vector may advantageously be simplified by making use of the associative character of the MRC optimal combining operations. Minimizing the cost function output by the optimal combining modules amounts to working on an order of diversity n_div/n_pol. In this situation, the quantities $(\gamma_k)_{1 \leq k \leq n\_div}$ become $(\gamma_{ant\_j})_{1 \leq j \leq n\_ant}$ and may be written as $$\gamma_{ant\_j} = \frac{pow_r^{ant\_j}}{N_r^{ant\_j}}$$

for $1 \leq i \leq n\_ant$ where $pow_r^{ant\_j}$ denotes the received mean power contribution of the useful signal on the antenna ant_j, and $N_r^{ant\_j}$ denotes the received mean power contribution of the corresponding noise.

The matrix equation (2) yields:

$$\gamma_{ant\_1} = \frac{p_e^{pol\_1} \times b_1 + (P - p_e^{pol\_1}) \times b_2}{N_r^{ant\_1}} \quad (4)$$

and $$\gamma_{ant\_2} = \frac{p_e^{pol\_2} \times b_3 + (P - p_e^{pol\_2}) \times b_4}{N_r^{ant\_2}} \quad (5)$$

It follows that, by differentiating the cost function $BER_{MRC}$ (1), the expression for the optimal powers for each transmitted polarization, for example in the downlink direction, is given by:

$$\hat{p}_{e,BS}^{pol\_1} = \frac{\left(N_{r,MS}^{ant\_1} + b_2 \cdot P\right) \times (b_4 - b_3) + \left(N_{r,MS}^{ant\_2} + b_4 \cdot P\right) \times (b_2 - b_1)}{2 \cdot (b_1 - b_2) \cdot (b_3 - b_4)} \quad (6)$$

and $$\hat{p}_{e,BS}^{pol\_2} = P - \hat{p}_{e,BS}^{pol\_1} \quad (7)$$

Figure 3:
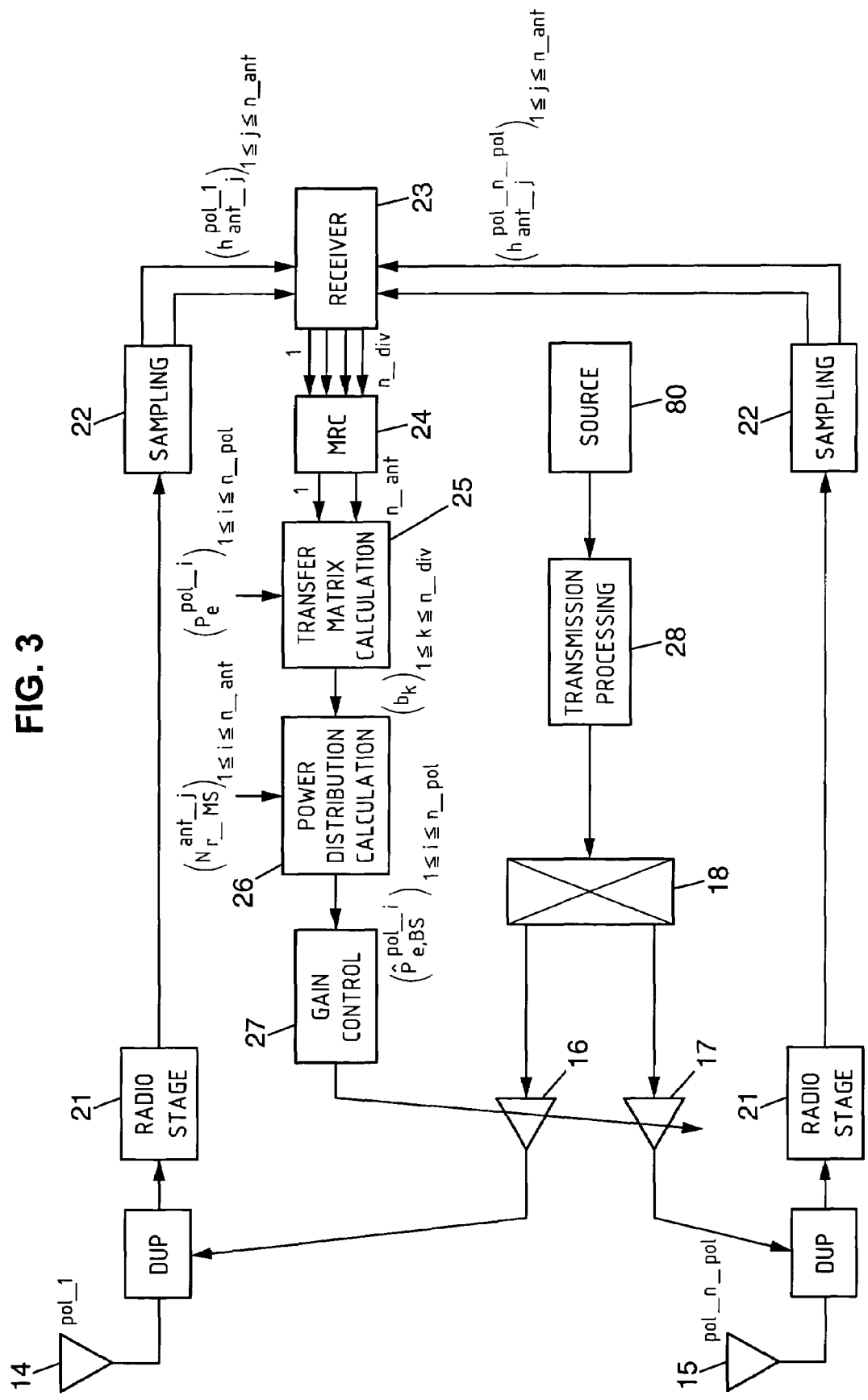
FIG. 3 is a block diagram of an embodiment of a transceiver of a radiocommunication station according to the invention.

This method of implementing the invention is described below in an example applied to a radiocommunication network using the CDMA (Code Division Multiple Access) technique. FIG. 3 illustrates the receiving part of a transceiver (11) of a radiocommunication station (10) operating in polarization-diversity mode according to the invention. The station has n_pol=2 receiving antennas, each of the antennas (14) (15) being sensitive to each polarization $(pol\_i)_{1 \leq i \leq n\_pol}$. A radio stage (21), placed downstream of each antenna (14) (15), carries out the amplification, frequency transposition, filtering and digitization processing in order to generate a baseband signal from the radio signal picked up by the antenna (14) (15).

In a CDMA system with spectrum spreading, the sequences of the transmitted symbols (seq), generally binary (±1) or quaternary (±1±j), are multiplied by spreading codes composed of samples, called "chips", the rate of which is greater than that of the symbols, in a ratio called SF (Spreading Factor). Orthogonal or quasi-orthogonal spreading codes are allocated to various channels sharing the same carrier frequency, so as to allow each receiver to detect the symbol sequence that is intended for it, by multiplying the received signal by the corresponding spreading code.

Each antenna (14) (15) is coupled in receive mode to a conventional receiver that carries out a coherent demodulation based on an approximation of the impulse response of the radio propagation channel. To estimate an impulse response, a sampling module (22) conventionally includes a filter matched to the spreading code of the channel or to the transmitted pilot-symbol sequence in question. While a pilot symbol, known a priori by the base station (11), is being received, the output of this matched filter is multiplied by the complex conjugate of this pilot symbol, which produces an observation of the impulse response. The estimate is obtained by averaging these observations over a few tens of pilot symbols.

The station (10) receives pilot sequences $(seq\_pil_{ant\_j}^{pol\_i})_{1 \leq i \leq n\_pol, \ 1 \leq j \leq n\_ant}$ corresponding to sequences $(seq\_pil_{ant\_j})_{1 \leq j \leq n\_ant}$ transmitted by the station (13), these consisting of pilot symbol sequences $(seq\_pil\_symb_{ant\_j})_{1 \leq j \leq n\_ant}$ multiplied by the spreading code of the channel. This allows each module (22) to estimate separately each impulse response vector $(h_k)_{0 \leq k \leq n\_div}$, the components of which characterize the propagation channel for a signal transmitted on one transmitting antenna among the n_ant of the station (13). This processing is carried out for each of the n_pol branches of the diversity receiver of the station (10) so that, in the example of implementing the invention, the n_pol modules (22) provide n_div impulse response estimates $(h_{ant\_j}^{pol\_i})_{1 \leq i \leq n\_pol, \ 1 \leq j \leq n\_ant}$. On the basis of these n_div estimated impulse responses, a module (23) carries out a coherent demodulation and a decoding of the n_pol signals received on each antenna. The demodulation may be carried out, for example, by means of a RAKE-type receiver. The estimates of the transmitted symbols thus obtained are then combined within the module (24) in order to obtain a diversity gain. The module (24) produces n_pol estimated symbol sequences, each corresponding to the combining of the signals received in one transmission polarization from among the n_pol of the station (10).

The module (25) determines power transfer coefficients $(b_k)_{1 \leq k \leq n\_div}$ from the channel estimate or from the demodulated signals (bit estimate), from which it measures the mean power contribution $(p_r^{pol\_i})_{1 \leq i \leq n\_pol}$ and mean power contributions $(p_e^{pol\_i})_{1 \leq i \leq n\_pol}$ of the station (13). The module (26) then determines an optimal power vector $(\hat{p}_{e,BS}^{pol\_i})_{1 \leq i \leq n\_pol}$, the components of which corresponding to each polarization it transmits to the control module (27) which causes the power amplifiers (16) (17) to operate in transmit mode.

Figure 4:
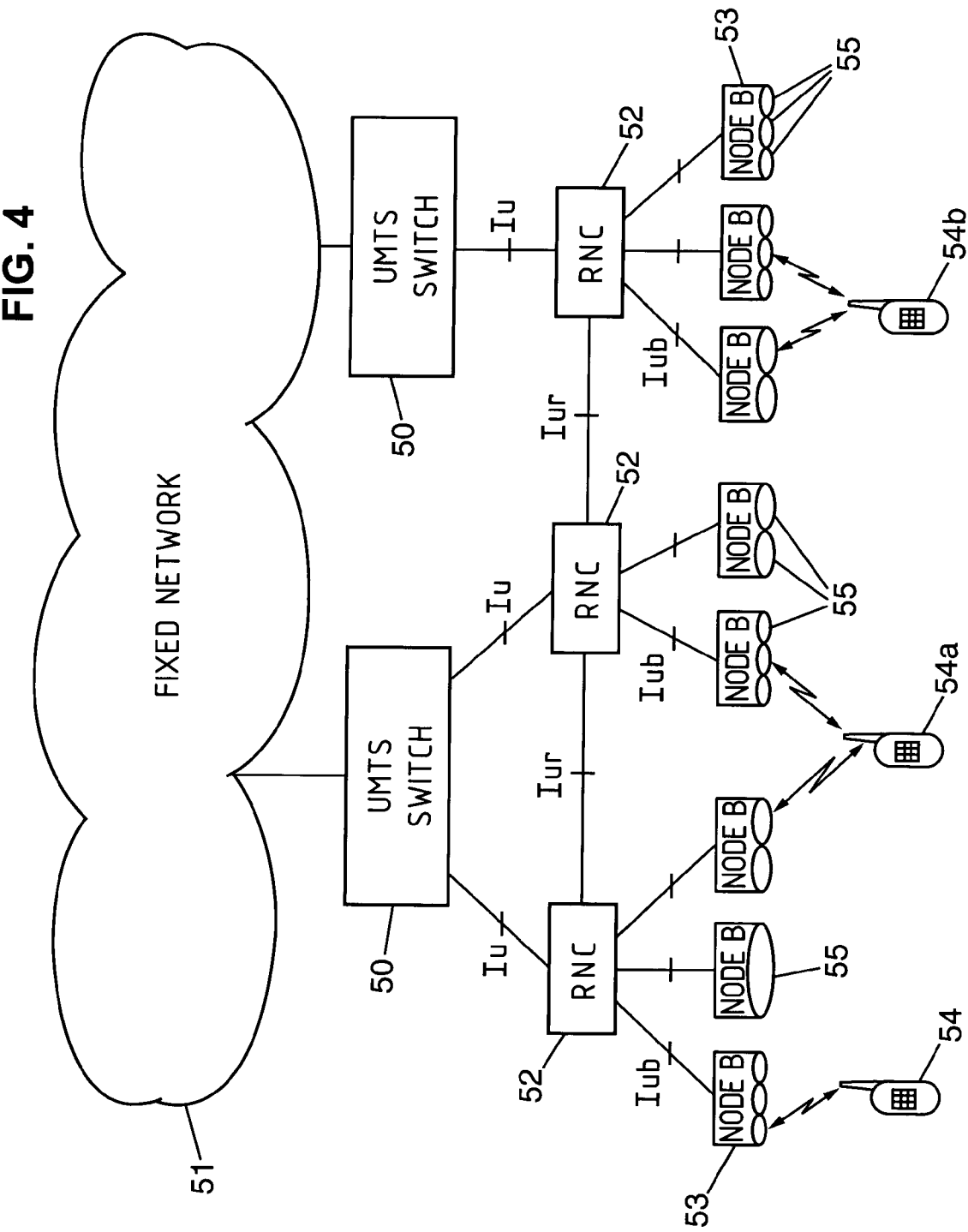
FIG. 4 is a diagram of a UMTS network.

These processing operations assume that the station (11) has the mean power contributions $(p_e^{pol\_i})_{1 \leq i \leq n\_pol}$ of the station (13) and the mean noise power contributions $(N_{r,MS}^{pol\_i})_{1 \leq i \leq n_{13}\_pol}$ of the station (13) in receive mode. This data may be delivered to the station (11) by means of a feedback loop, an example of which is provided below in the context of UMTS-type third generation networks, the architecture of which is shown in FIG. 4.

The mobile service switches 50, belonging to a CN (Core Network) are connected, on the one hand, to one or more fixed networks 51 and, on the other hand, by means of the so-called Iu interface, to RNCs (Radio Network Controllers) 52. Each RNC 52 is connected to one or more base stations 53 by means of the so-called Iub interface. The base stations 53, distributed over the coverage area of the network, are capable of communicating by radio with the mobile terminals 54, 54a, 54b called UEs (User Equipments). The base stations 53, also called "node B", may each serve one or more cells by means of respective transceivers 55. Some of the RNCs 52 may further communicate with one another by means of the so-called Iur interface. The RNCs and the base stations form a UTRAN (UMTS Terrestrial Radio Access Network).

The UMTS networks use a W-CDMA (Wideband CDMA) technique. The chip rate is 3.84 Mchips/s in the case of UMTS. The spreading codes make a distinction between various physical channels that are superimposed on the same transmission resource consisting of a carrier frequency. In the case of UMTS in FDD (Frequency Division Duplex) mode on the downlink, a scrambling code is allocated to each transceiver corresponding to a cell served by a base station, and various physical channels in this cell are distinguished by mutually orthogonal channelization codes. The transceiver may also use several mutually orthogonal scrambling codes, one of them being a primary scrambling code. In the uplink, the transceiver uses the scrambling code to separate the transmitting mobile terminals and, optionally, the channelization code to separate the physical channels deriving from one and the same terminal. For each physical channel, the overall spreading code is the product of the channelization code multiplied by the scrambling code. The spreading factor (equal to the ratio of the chip rate to the symbol rate) is a power of 2 of between 4 and 512. This factor is chosen according to the symbol rate of the symbols to be transmitted in the channel.

In a preferred embodiment of the invention, the signals transmitted by the terminal in each of the polarizations are transmitted with the same power. The transmission power of a user equipment may be known by the base station by means of measurement procedures requested of the UEs by the RNC, in order thereafter to be transmitted to the base stations via the Iub interface.

The measurement procedures are described, for example, in Section 8.4 of the Technical Specification 3G TS 25.331, "Radio Resource Control (RRC) Protocol Specification", Version 3.9.0, published in December 2001 by 3GPP and in the Technical Specification 3G TS 25.215, "Physical Layer; Measurements (FDD)", Version 3.9.0, published in December 2001 by 3GPP. The measurements desired by the RNC are requested of the UEs in MEASUREMENT CONTROL messages in which the report modes are also indicated, for example with a specified periodicity or in response to certain events. The measurements specified by the RNC are then effected by the UE, which sends them back up on the RRC connection in MEASUREMENT REPORT messages (see Sections 10.2.15 and 10.2.17 of the Technical Specification 3G TS 25.331). These MEASUREMENT CONTROL and MEASUREMENT REPORT messages are relayed transparently by the transceivers 55 of the base stations. The measurements taken into consideration by the RNC in order to control the radio links include power measurements (of the "UE transmitted power" measurement type described in Section 5.1.7 of the Technical Specification 25.215, Version 3.9.0) that are made on the pilot channels or signals and are obtained by a measurement module located in the UE. The measurements obtained by this measurement module are sent to the RNC via an RRC (Radio Resource Control) protocol belonging to layer 3 of the ISO model described in the Technical Specification 3G TS 25.331. These power measurements may then be retransmitted to the base station, for example by means of the NBAP (Node B Application Protocol) of the transceivers (for the protocol, see the Technical Specification 3G TS 25.433, Version 3.9.0, published in March 2002 by 3GPP).

Next, we consider that the mean noise power contributions $(N_{r,MS}^{pol\_i})_{1 \leq i \leq n\_pol}$ of the station (13) in receive mode are identical in the various polarizations and are denoted by $N_{r,MS}$. This contribution may be expressed as:

$$N_{r,MS} = RSSI_{MS} - \frac{p_{e,BS}}{\text{"pathloss"}}$$

in which the quantity RSSI (Received Signal Strength Indicator) denotes the power received in the bandwidth of the signals around a UMTS carrier. This power may be measured by the radio receiver of the station (13). In a UMTS system, the UE may also calculate the attenuation or "pathloss" of the signal in the propagation channel from each node B of a monitored system for implementing the macrodiversity mode. The Standard stipulates that the RNC can request the UE to report back to it regarding this pathloss parameter (3G TS 25.331, Sections 10.3.7.38 and 14.1.1) and this received power (3G TS 25.331, Sections 10.3.7.15 and 10.3.7.21). As previously, these measurements may then be retransmitted to the base station, for example by means of the NBAP protocol (see the aforementioned Technical Specification 3G TS 25.433).

The orthogonality of the pilot sequences $(seq\_pil_{ant\_j})_{1 \leq j \leq n\_ant}$ may be provided in two operating modes detailed below.

The first operating mode is characterized by the determination of the physical channel or channels to be used for communication between the station (13) and the transceiver (11), and also their format, a communication channel having characteristics specific to its format. The various existing formats are given in Table 11 of Section 5.3.2 of the Technical Specification 3G TS 25.211, "Physical channels and mapping of transport channels onto physical channels (FDD)", Version 3.9.0, published in December 2001 by 3GPP. One of the major characteristics of a communication channel is its spreading factor SF. The higher the SF of a channel, the lower the data rate that it offers. However, at the same time the higher the SF of a channel, the longer the duration of a symbol, thus allowing better robustness with respect to interference. In the UMTS system illustrated in FIG. 4, the RNC 52 can decide to modify the current communication channels in order to replace them with one or more communication channels of different SF. Similar processing may also be carried out, not during communication, but at initialization thereof, during allocation of the radio resources.

To illustrate this general principle, let us consider a communication channel of SF 8 used at a given moment between a mobile terminal 54 and a fixed transceiver 55. This is, for example, a format No. 15 channel according to the codification of the Technical Specification 3G TS 25.211. The RNC can choose to use, as a replacement for this communication channel, two other channels of SF 16, for example of format No. 14. The mobile terminal 54 then operates in multicode transmit mode. The communication is then also distributed between the two channels. The resultant data rate is slightly lower with the SF 16 channels, but this will not prevent the required service being offered.

When the mobile unit transmits polarization-diversity signals in multicode mode, each communication channel in transmit mode may be allocated so as to transmit with a given channel code in one polarization. In the above example, each SF 16 channel may be transmitted on an antenna of the mobile terminal, each antenna generating radio signals of polarization $(pol\_i)_{1 \leq i \leq n\_pol}$. This makes it possible to combine a channel code with a polarization, thereby ensuring orthogonality of the sequences $(seq\_pil_{ant\_j})_{1 \leq j \leq n\_ant}$ transmitted on each antenna.

In the UMTS system, the operation of a mobile unit in multicode mode is controlled by the corresponding RNC.

The channels to be used by the mobile terminal are transmitted by the RNC according to the RRC protocol, as presented in the aforementioned Technical Specification 3G TS 25.331, thanks to a setup command message or a channel reconfiguration message: "Radio bearer setup", "Radio bearer reconfiguration" or "Physical channel reconfiguration". Each of these messages contains an item of information called "Downlink information for each radio link" (see Section 10.3.6.27 of the 3G TS 25.331). This message itself contains an item of information called "Downlink DPCH info for each RL" (see Section 10.3.6.21 of the 3G TS 25.331). The latter message contains a number of items of information for characterizing the channels to be used. Among this information are the downlink channel codes, the spreading factors and the associated scrambling codes. Upon receiving this message, the mobile terminal is able to use the channel or channels identified and transmitted by the RNC.

In another operating mode, the orthogonality of the transmitted pilot sequences $(seq\_pil_{ant\_j})_{1 \leq j \leq n\_ant}$ is ensured by the orthogonality of the relevant pilot symbol sequences $(seq\_pil\_symb_{ant\_j})_{1 \leq j \leq n\_ant}$.

Figure 5:
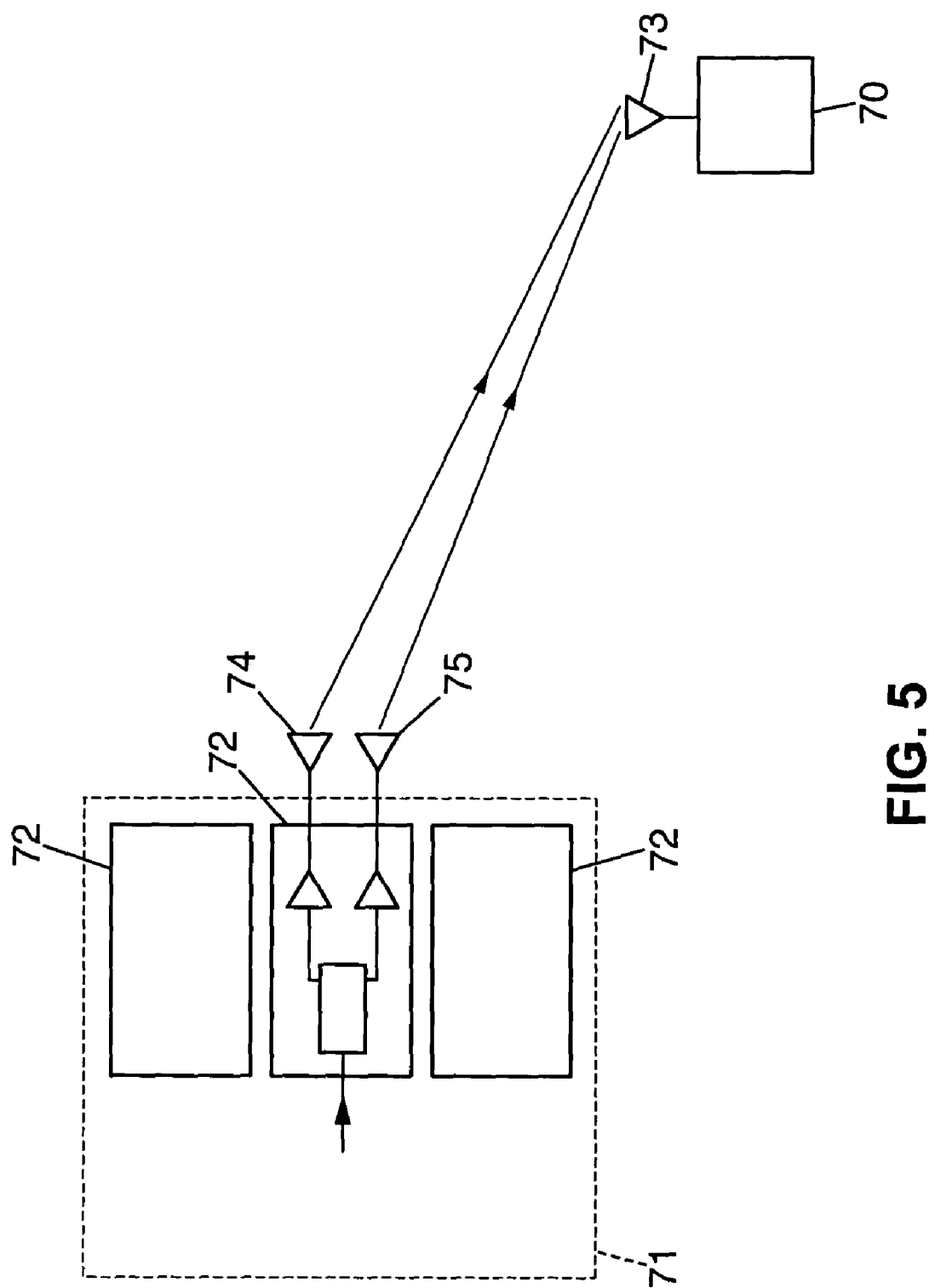
FIG. 5 is a diagram of a radiocommunication station and of a mobile terminal illustrating a second embodiment of the invention.

In a second embodiment of the invention illustrated by FIG. 5, the mobile station (70) is equipped with n_ant=1 dipole antenna (73). Considering the polarity rotations which occur along the propagation path between the transmitter and the receiver, this antenna (73) is sensitive in receive mode to each of the n_pol transmission polarizations of the fixed station (71). The diversity order is then equal to n_pol (equal to 2 in the example in FIG. 5).

In the case of links between the stations (70) and (71) using a DPSK modulation, the mean bit error probability according to MRC combining may be written as:

$$BER_{MRC} = \frac{1}{2} \cdot \prod_{i=1}^{n\_pol} \left( \frac{1}{1+\gamma_i} \right) \quad (8)$$

where $(\gamma_i)_{1 \leq i \leq n\_pol}$ denotes the mean signal-to-noise ratio measured on the useful signal portions received by the station (70) in the polarization $(pol\_i)_{1 \leq i \leq n\_pol}$ when there is fast fading having a Rayleigh probability density.

The aim is to minimize $BER_{MRC}$ (8) under the constraint:

$$\sum_{i=1}^{n\_pol} p_{e,BS}^{pol\_i} = P \quad (9)$$

The quantities $(\gamma_i)_{1 \leq i \leq n\_pol}$ may be written as:

$$\gamma_i = \frac{pow_r^{pol\_i}}{N_r^{pol\_i}}$$

for $1 \leq i \leq n\_pol$ where $pow_r^{pol\_i}$ denotes the mean power contribution received by the station (70) of the useful signal transmitted in the polarization pol_i and $N_r^{pol\_i}$ denotes the received mean noise power contribution. Denoting by $(b_i)_{1 \leq i \leq n\_pol}$ the attenuation coefficient suffered by the useful signal transmitted in the polarization pol_i, it becomes:

$$\gamma_i = \frac{b_i \cdot p_e^{pol\_i}}{N_r^{pol\_i}}.$$

Conventional constrained optimization techniques (such as for example Lagrangian multipliers) give the optimum value:

$$\hat{p}_{e,BS}^{pol\_i} = \frac{p}{n\_pol} + \frac{1}{n\_pol} \sum_{l=1}^{n\_pol} \frac{N_r^{pol\_l}}{b_l} - \frac{N_r^{pol\_i}}{b_i} \quad (10)$$

Assuming that the received mean power contribution of the noise is identical in each polarization and is denoted by $N_r$, we obtain:

$$\hat{p}_{e,BS}^{pol\_i} = \frac{p}{n\_pol} + \frac{N_r}{n\_pol} \sum_{l=1}^{n\_pol} \frac{1}{b_l} - \frac{N_r}{b_i} \quad (11)$$

i.e. for a polarization diversity of order 2, as illustrated in FIG. 5:

$$\hat{p}_{e,BS}^{pol\_1} = \frac{P}{2} + \frac{N_r}{2}\left(\frac{1}{b_2} - \frac{1}{b_1}\right) \quad (12)$$

and $$\hat{p}_{e,BS}^{pol\_2} = \frac{P}{2} + \frac{N_r}{2}\left(\frac{1}{b_1} - \frac{1}{b_2}\right) \quad (13)$$

As previously, application of the reciprocity theorem makes it possible to obtain the coefficients $(b_i)_{1 \leq i \leq n\_pol}$ from a measurement of the pathlosses in the uplink direction, from the station (70) to the station (71). The coupling of each antenna (74) (75) of the transceiver (72) having a conventional receiver makes it possible to implement the above example of a method of obtaining the coefficients $(b_i)_{1 \leq i \leq n\_pol}$.

The transmission power of the station (71) on each antenna (74) (75) corresponding to a given polarization is therefore adjusted so as to give priority to the best path of the transmitted signal. This method may advantageously be combined with other transmission diversity schemes, provided for example for GSM (Global System for Mobile Telecommunications) type networks or for UMTS-type networks, such as the abovementioned STTD scheme. In this situation, the two versions of the radio signal are transmitted in the STTD transmission scheme. They are consequently not transmitted simultaneously.

The invention claimed is:

1. A method of transmitting a radio signal with polarization diversity, comprising the steps of: transmitting a plurality of versions of the radio signal having different polarizations from a first station to a second station; and adaptively controlling respective transmission powers of said versions of the radio signal according to measurements carried out by the first station on signals transmitted by the second station, wherein an optimal transmission power distribution of the radio signal between the polarizations is estimated on the basis of minimizing a cost function relative to a quality of the signal received by the second station, and the transmission power is distributed between said versions of the radio signal in accordance with the estimated distribution.

2. The method as claimed in claim 1, wherein said versions of the radio signal are transmitted simultaneously.

3. The method as claimed in claim 1, wherein the cost function to be minimized measures an error probability in receive mode.

4. The method as claimed in claim 1, wherein transmission parameters for signals transmitted by the second station to the first station and parameters for the receiving by the second station of said versions of the radio signal transmitted with polarization diversity by the first station are measured, and said measured parameters are transmitted to the first station in order to estimate the optimal transmission power distribution.

5. The method as claimed in claim 4, wherein said second station is designed to transmit with polarization diversity, the method further comprising the steps of:

for each transmit polarization, measuring a mean power contribution of at least some of the signals transmitted by the second station;

for at least some of the signals transmitted in a defined polarization by the first station to the second station, measuring a mean power contribution of the noise that interferes in receive mode with the useful signal relating to said transmitted signal; and for each transmit polarization, evaluating at the first station power transfer coefficients in a radio propagation channel of at least some of the signals transmitted by the second station.

6. The method as claimed in claim 5, wherein the mean noise power contribution and mean transmission power contribution measurement steps are executed in the second station and the measured mean noise power contribution and mean transmission power contribution are transmitted to the first station for estimating the optimal distribution of the transmission power.

7. The method as claimed in claim 4, wherein said second station is designed to transmit with polarization diversity, wherein the mean power contribution of the signals transmitted by the second station is substantially identical for each polarization, the method further comprising the steps of:

measuring a, mean power contribution of at least some of the signals transmitted by the second station;

for at least some of the signals transmitted in a defined polarization by the first station to the second station, measuring a mean power contribution of the noise that interferes in receive mode with the useful signal relating to said transmitted signal; and for each transmit polarization, evaluating at the first station power transfer coefficients in a radio propagation channel of at least some of the signals transmitted by the second station.

8. The method as claimed in claim 7, wherein the mean noise power contribution and mean transmission power contribution measurement steps are executed in the second station and the measured mean noise power contribution and mean transmission power contribution are transmitted to the first station for estimating the optimal distribution of the transmission power.

9. A radiocommunication station with polarization diversity, comprising means for transmitting a plurality of versions of a radio signal having different polarizations to a remote radiocommunication station, means for measuring parameters on the basis of signals transmitted by said remote station, and means for adaptively controlling the respective transmission powers of said versions of the radio signal according to said measured parameters, wherein the means for adaptively controlling the transmission powers comprise means for estimating an optimal distribution of the transmission power of the signals between the polarizations, on the basis of minimizing a cost function relating to the quality of the signal received by the remote station, and means for driving the transmission means so as to distribute the transmission power between said polarizations according to the estimated distribution.

10. The radiocommunication station as claimed in claim 9, wherein the transmission means are coupled to $n_{13}$pol antennas, $n_{13}$pol being a number greater than or equal to two, and are designed to transmit from each antenna a radio signal in one polarization from among $n_{13}$ pol polarizations.

11. The radiocommunication station as claimed in claim 10, further comprising receiving means coupled to the $n_{13}$ pol antennas sensitive in receive mode to the $n_{13}$ pol polarizations, and wherein the means for estimating the optimal transmission power distribution cooperate with means for obtaining parameters for the transmitting of signals by the remote station and for the receiving of signals transmitted to the remote station and with means for obtaining parameters for the receiving of signals transmitted by the remote station.

12. The radiocommunication station as claimed in claim 11, wherein the means for obtaining parameters for the receiving of signals transmitted by the remote station comprise means for obtaining, for each of the $n_{13}$ pol polarizations, a mean power contribution of at least some of the signals transmitted by the remote station and means for estimating power transfer coefficients for signals transmitted by the remote station in each of the $n_{13}$ pol polarizations and received on each of the n_pol antennas.

13. The radiocommunication station as claimed in claim 11, wherein the means) for obtaining parameters for the receiving of signals transmitted by the remote station comprise means for obtaining a mean power contribution of at least some of the signals transmitted by the remote station and means for determining power transfer coefficients for signals transmitted by the remote station in each of the $n_{13}$ pol polarizations and received on each of the $n_{13}$ pol antennas.

14. The radiocommunication station as claimed in claim 11, wherein the means for obtaining parameters for the receiving of signals transmitted by the remote station comprise means for estimating symbols transmitted by the remote station in each of the $n_{13}$ pol polarizations, and received on each of the $n_{13}$ pol antennas, and. means for combining the estimated symbols.

15. The radiocommunication station as claimed in claim 10, wherein $n_{13}$ pol=2.

16. The radiocommunication station as claimed in claim 9, wherein the means for estimating the optimal transmission power distribution comprise means for minimizing an error probability in receive mode by the remote station.

17. The radiocommunication station as claimed in claim 9, further comprising means for obtaining parameters for the transmitting of signals by the remote signal and for the receiving of signals transmitted to the remote station, cooperating with the means for estimating the optimal transmission power distribution.

18. The radiocommunication station as claimed in claim 17, wherein the means for obtaining parameters for the transmitting of signals by the remote station and for the receiving of signals transmitted to the remote station comprise means for obtaining, for at least one of the signals transmitted to the remote station in one defined polarization among $n_{13}$ pol, a measurement of a mean power contribution of the noise that interferes with the useful signal relating to said transmitted signal.

19. The radiocommunication station as claimed in claim 17, wherein the means for obtaining parameters for the transmitting of signals by the remote station and for the receiving of signals transmitted to the remote station comprise means for measuring, for each of the $n_{13}$ pol transmission polarizations, a mean power contribution of at least some of the signals transmitted by the remote station.

* * * * *

UNITED STATES PATENT AND TRADEMARK OFFICE
CERTIFICATE OF CORRECTION

PATENT NO. : 7,369,814 B2
APPLICATION NO. : 10/645254
DATED : May 6, 2008
INVENTOR(S) : Thierry Lucidarme and Nidham Ben Rached It is certified that error appears in the above-identified patent and that said Letters Patent is hereby corrected as shown below:

Column 13:
Line 58, "$n_{13}pol$" should be --$n\_pol$--;
Line 59, "$n_{13}pol$" should be --$n\_pol$--;
Line 61, "$n_{13}pol$" should be --$n\_pol$--;
Line 63, "$n_{13}pol$" should be --$n\_pol$--.

Column 14:
Line 1, "$n_{13}pol$" should be --$n\_pol$--;
Line 11, "$n_{13}pol$" should be --$n\_pol$--;
Line 15, "$n_{13}pol$" should be --$n\_pol$--;
Line 23, "$n_{13}pol$" should be --$n\_pol$--;
Line 24, "$n_{13}pol$" should be --$n\_pol$--;
Line 30, "$n_{13}pol$" should be --$n\_pol$--;
Line 31, "$n_{13}pol$" should be --$n\_pol$--;
Line 34, "$n_{13}pol$" should be --$n\_pol$--;
Line 52, "$n_{13}pol$" should be --$n\_pol$--;
Line 59, "$n_{13}pol$" should be --$n\_pol$--.

Signed and Sealed this

Twenty-second Day of July, 2008

JON W. DUDAS
*Director of the United States Patent and Trademark Office*